(12) United States Patent  (10) Patent No.: US 7,581,744 B1
Johansson  (45) Date of Patent: Sep. 1, 2009

(54) VEHICLE EXTENSION DEVICE

(75) Inventor: Arne Johansson, Braås (SE)

(73) Assignee: Volvo Articulated Haulers AB, Vaxjo (SE)

( * ) Notice: Subject to any disclaimer, the term of this patent is extended or adjusted under 35 U.S.C. 154(b) by 371 days.

(21) Appl. No.: 10/088,584

(22) PCT Filed: Sep. 28, 2000

(86) PCT No.: PCT/SE00/01883

§ 371 (c)(1),
(2), (4) Date: May 21, 2002

(87) PCT Pub. No.: WO01/25075

PCT Pub. Date: Apr. 12, 2001

(30) Foreign Application Priority Data

Oct. 1, 1999 (SE) .................................. 9903568

(51) Int. Cl.
*B62D 53/00* (2006.01)
(52) U.S. Cl. .................................................. 280/407
(58) Field of Classification Search ................ 280/407, 280/DIG. 8; 180/312, 377; 464/170, 177–178, 464/182, 901, 113
See application file for complete search history.

(56) References Cited

U.S. PATENT DOCUMENTS

| 2,807,477 | A | * | 9/1957 | Tuso, Jr. ...................... 280/407 |
| 3,606,384 | A | * | 9/1971 | Fontaine et al. .............. 280/407 |
| 4,149,607 | A | * | 4/1979 | Hopkins et al. ........... 180/70 R |
| 4,435,166 | A | * | 3/1984 | Bondioli ...................... 464/172 |
| 4,496,334 | A | * | 1/1985 | Mikeska ...................... 464/175 |
| 4,993,737 | A | * | 2/1991 | Torcomian .................. 280/407 |
| 5,044,651 | A | * | 9/1991 | Weikel ........................ 280/407 |
| 5,240,273 | A | * | 8/1993 | Stead et al. ................. 280/489 |
| 5,338,050 | A | * | 8/1994 | Haire et al. .............. 280/476.1 |
| 5,344,271 | A | * | 9/1994 | Bratlie et al. ............... 414/385 |
| 5,632,350 | A | * | 5/1997 | Gauvin ...................... 180/9.44 |
| 5,671,937 | A | * | 9/1997 | Haberle ...................... 280/407 |
| 5,687,860 | A | * | 11/1997 | Behrens et al. ................. 213/7 |
| 5,707,070 | A | * | 1/1998 | Lindenman et al. ...... 280/438.1 |
| 5,725,063 | A | * | 3/1998 | Ceragioli et al. ........... 180/14.4 |
| 5,772,521 | A | * | 6/1998 | Herchenbach et al. ...... 464/170 |
| 5,806,870 | A | * | 9/1998 | Hull et al. .................... 280/400 |
| 5,870,931 | A | * | 2/1999 | Frantz .......................... 74/609 |

(Continued)

FOREIGN PATENT DOCUMENTS

FR    2554394 A1    5/1985

(Continued)

*Primary Examiner*—Faye M. Fleming
(74) *Attorney, Agent, or Firm*—Novak Druce + Quigg LLP

(57) ABSTRACT

An extension device for automotive vehicles, such as dumpers, having a framework with a front end section and a rear end section, and including a forward vehicle section supporting a prime mover and having a first articulation member, and a rear vehicle section having a second articulation member, the first and second articulation members being intended for connection with each other and for allowing pivoting of the vehicle sections in relation to each other about a longitudinal axis of the automotive vehicle, and further including a third articulation member connected to one of the end sections and a guide pin located on the rear end section having a bearing assembly for supporting a cardan shaft portion which extends through the extension device.

24 Claims, 3 Drawing Sheets

U.S. PATENT DOCUMENTS

| | | | | |
|---|---|---|---|---|
| 5,980,389 | A * | 11/1999 | Nienhaus | 646/172 |
| 6,062,982 | A * | 5/2000 | Cartwright | 464/113 |
| 6,152,341 | A * | 11/2000 | LeMay et al. | 224/509 |
| 6,189,640 | B1 * | 2/2001 | Young et al. | 180/235 |
| 6,190,106 | B1 * | 2/2001 | Richardson et al. | 414/339 |
| 6,217,455 | B1 * | 4/2001 | Yanata | 464/113 |
| 6,354,953 | B1 * | 3/2002 | Herchenbach et al. | 464/170 |
| 6,499,754 | B1 * | 12/2002 | Heyring et al. | 280/124.106 |
| 6,575,839 | B1 * | 6/2003 | Brandon | 464/178 |
| 6,578,657 | B2 * | 6/2003 | Baxter, Jr. | 180/376 |
| 6,695,328 | B2 * | 2/2004 | Cope | 280/124.111 |
| 6,716,401 | B2 * | 4/2004 | Benson | 422/297 |

FOREIGN PATENT DOCUMENTS

| | | |
|---|---|---|
| SE | 505 201 C2 | 7/1997 |
| SU | 729100 A | 4/1980 |

* cited by examiner

VEHICLE EXTENSION DEVICE

This application is the national phase under 35 U.S.C. § 371 of PCT International Application No. PCT/SE00/01883 which has an International filing date of Sep. 28, 2000, which designated the United States of America.

TECHNICAL FIELD

The present invention relates to an extension device for automotive vehicles, such as dumpers, comprising a framework with a front end section and a rear end section, said automotive vehicles including a forward vehicle section, supporting the prime mover, exhibiting a first articulation member, and a rear vehicle section exhibiting a second articulation member, said first and second articulation members being intended for connection with each other and for allowing pivoting of the vehicle sections, in relation to each other, around a longitudinal axis of the automotive vehicle.

BACKGROUND ART

When manufacturing commercial automotive vehicles, such as dumpers, it is presently customary to offer, together with a standardised forward vehicle section, a rear, load-carrying vehicle section, the length of which is adapted to the intended area of application and to any built-on accessories, such as a crane. This is resolved by manufacturing the rear vehicle section with a large number of frame lengths.

The above approach is not cost-effective, however, as production and storage will both be expensive due to the relatively small production series. Further, modifications to the vehicle length cannot be allowed after delivery.

However, there are cases where the fixed framework of the rear vehicle section is cut off, whereupon extension beams are welded in to obtain, in this way, a vehicle of the required length.

This, however, is a complicated and time-consuming operation, a/o requiring access to special tools and special equipment. Furthermore, such a solution may require giving the construction a lower strength at the joints, compared to the rest of the construction. Besides this, a subsequent treatment in the form of corrosion protection and painting has to be performed at the joints.

From SE 505 201 a vehicle chassis is previously known, intended for subsequent building-on of equipment, divided into a forward and a rear portion, each having two longitudinal frame members, connected to each other through an intermediate portion. Said intermediate portion comprises an intermediate framework and a number of holed junction members allowing free choice between a number of hole combinations for connecting the intermediate framework, by means of bolt or rivet joints, with the forward and rear portions of the vehicle chassis. An adjustment of the total length of the vehicle chassis can thus be made, in dependence of the selected size of the accessory subsequently to be fitted.

Although the method for extending vehicle frames described above enables an adaptation of the vehicle length, it still has some drawbacks. When modifying the vehicle length a large number of bolts, or rivets, will primarily have to be removed and, after the length adjustment, be refitted, which is very time-consuming. Furthermore, also in this case, there is a risk of the construction having a lower strength in relation to other framework portions.

Common to the above procedures for extension of automotive vehicles after delivery is that relatively large operations have to be performed on the framework of the vehicle, constituting a problem for the vehicle user.

DISCLOSURE OF INVENTION

The object of the invention is to enable an extension of the dumper without having to perform major reconstruction work on the dumper.

The above object is achieved by means of an extension device, the characteristics of which are defined by the independent claim 1.

It is a further object of the invention to provide a device for extension of automotive vehicles, such as dumpers, by which a simple, quick and secure adaptation can be made of the vehicle length, by utilising the parting line provided by the first and second articulation members of the dumper and inserting therebetween an extension device according to the present invention.

It is a further object of the invention to provide a device for extension of vehicles without having to perform extensive fitting work such as bolting/riveting/welding on the vehicle when one and the same vehicle is to be used for different work assignments.

The extension device according to the present invention is formed like a framework, comprising two parallel girders enclosed by walls, together defining an elongated, hollow girder having a forward end section and a rear end section, at least the forward one of said end sections being provided with a third articulation member, preferably in the form of a pivot sleeve with a circular cross section, which can be connected to the first articulation member arranged on the forward vehicle section of the dumper that is formed like a pivot pin having a circular cross section.

In a preferred embodiment of the present invention, the extension device is provided with a guide pin, the shape of which substantially coincides with said pivot pin, serving as a guide and reinforcement when fitting the extension device onto the rear, load-carrying vehicle section.

Further advantages and objects of the invention will become apparent from the appended claims and the following description.

BRIEF DESCRIPTION OF DRAWINGS

The invention will be described below in connection with preferred embodiment examples and the enclosed drawings, in which.

PREFERRED EMBODIMENT

Figure 1:
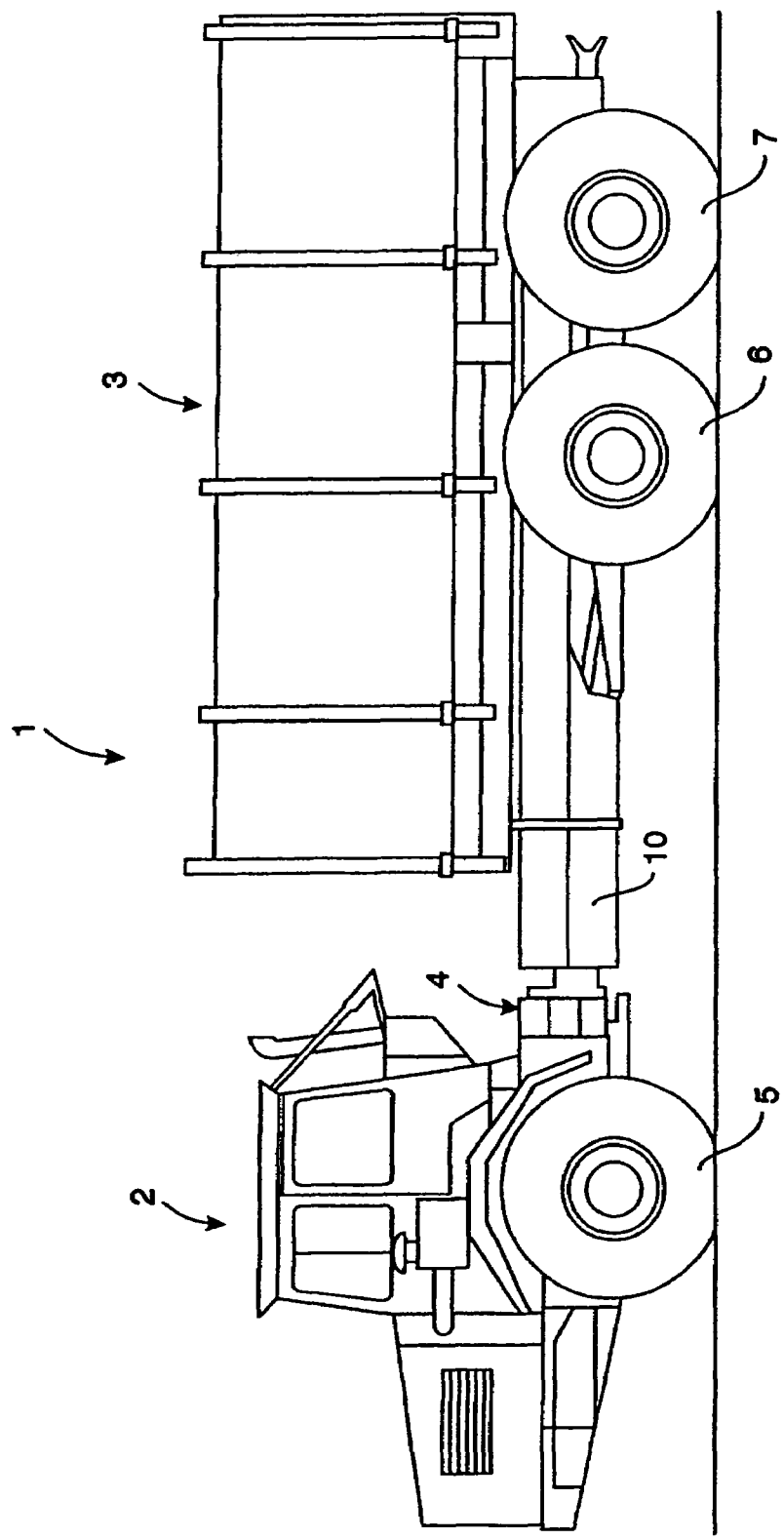
FIG. 1 shows a side elevational view of a dumper equipped with an extension device according to the present invention.

FIG. 1 illustrates a side elevational view of an articulated or frame-steered vehicle, a so-called dumper 1, having in a known manner a forward vehicle section 2, supporting the prime mover, and a rear, load-carrying vehicle section 3, connected to the forward vehicle section 2 via a vertical pivot axle 4. Between the forward vehicle section 2 and the rear vehicle section 3, an extension device 10 according to the present invention is arranged.

The forward and rear vehicle sections, 2 and 3, respectively, are also pivotally connected to each other about a not shown horizontal pivot pin, allowing the vehicle sections to pivot in relation to each other about a longitudinal axis of the vehicle.

For steering of the vehicle 1 when being driven, the forward vehicle section 2 is brought to turn about the vertical pivot axle 4 by means of a pair of not shown hydraulic cylinders, arranged one on each side of the pivot axle 4. The torque delivered by the prime mover is transferred to the front wheels 5 and to the rear wheels 6, 7, via a not shown cardan shaft.

Figure 2:
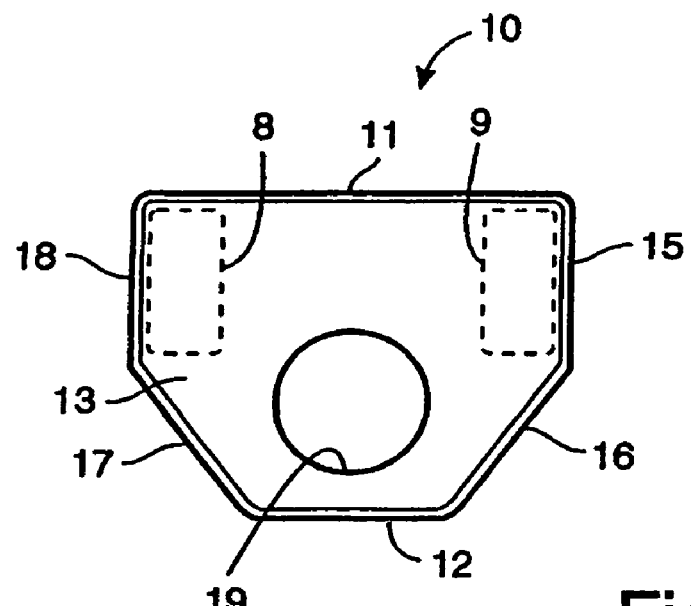
FIG. 2 shows the front end section of an extension device according to the present invention.
Figure 3:
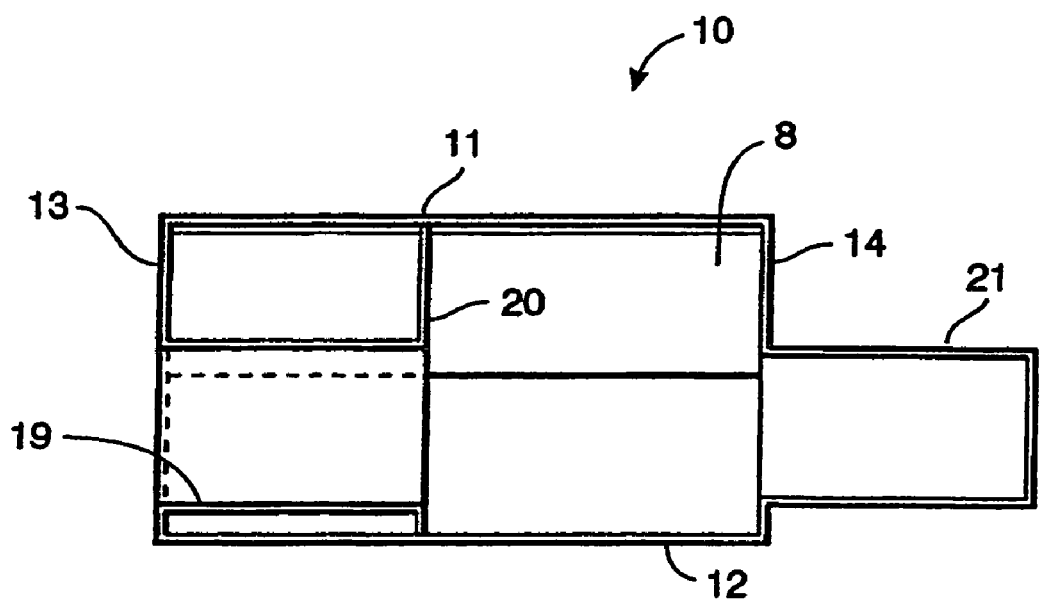
FIG. 3 shows a longitudinal, vertical cross section through an extension device according to the present invention.

With reference to FIGS. 2 and 3, a preferred embodiment of an extension device 10 according to the present invention will now be described. In the illustrated embodiment, the extension device 10 is formed like a framework comprising two parallel girders enclosed by walls, together defining an elongated, hollow girder. The framework hereby comprises an upper supporting portion 11 and a lower supporting portion 12 extending between a forward end section 13 and a rear end section 14. Adjacent to said upper supporting portion 11, two parallel girders 8, 9 extend between said end sections 13, 14. Side portions 15, 16, 17, 18 also extend between the end sections 13, 14, providing, together with the girders 8, 9 and the upper 11 and the lower 12 supporting portions, the stiffness and strength of the construction. According to a preferred embodiment, the above-mentioned portions 11, 12, 15, 16, 17, 18 and the sections 13, 14 are comprised of steel plates welded together to define said elongated, hollow girder.

In the forward end section 13, a third articulation member in the form of a pivot sleeve 19 with a circular cross section, intended for co-operation with a horizontal pivot pin with a circular cross section, arranged on the forward vehicle section 2, allowing the extension device 10 to pivot, in relation to said forward vehicle section 2, about a longitudinal axis of the vehicle 1. In a preferred embodiment, the pivot sleeve 19 is on the one hand connected to the end section 13, on the other to a bulkhead 20, arranged in parallel with the end section 13 and constituting a connection member between said upper 11 and lower 12 supporting portions.

FIG. 3 shows an especially preferred embodiment of the present invention in which the rear end section 14 is provided with a guide pin 21 of circular cross section. When fitting the extension device 10 onto the rear vehicle section 3, the guide pin 21 will function as a guide, through being inserted into the articulation member 22 of the rear vehicle section 3. When the extension device 10 is fitted onto the rear vehicle section 3, the guide pin 21 will contribute to reinforcing the junction between the vehicle section 3 and the extension device 10.

Figure 4:
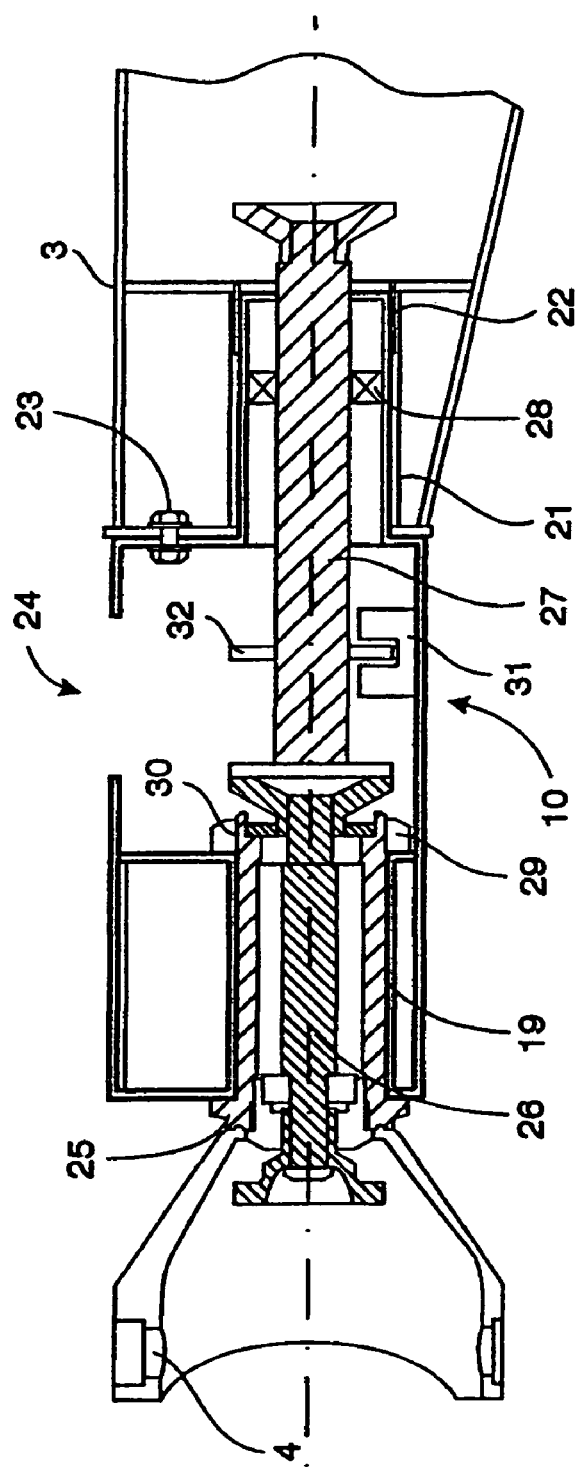
FIG. 4 shows a longitudinal, vertical cross section through an extension device, fitted onto a rear vehicle section, according to the present invention.

FIG. 4 illustrates a more complete embodiment of the present invention with the extension device 10 fitted between the forward vehicle section 2 and the rear vehicle section 3. The guide pin 21 is hereby inserted into the articulation member 22 of the rear vehicle section 3, substantially coinciding in shape with the previously discussed pivot sleeve 19. To prevent rotation about the guide pin 21 of the extension device 10, relative to the rear vehicle section 3, a bolted joint 23 is provided, connecting the rear end section 14 of the extension device 10 with the rear vehicle section 3. Said bolted joint 23 is accessed through an aperture 24 provided in the upper supporting portion 11.

In FIG. 4, the previously mentioned horizontal pivot pin 25 is shown, which is connected, via the pivot axle 4, to the forward vehicle section. The pivot pin 25 is locked in the axial direction in relation to the pivot sleeve 19 of the extension device, by means of a locking member in the form of a nut 29 arranged to co-operate with a threaded portion 30 on the pivot pin 25.

According to a preferred embodiment, the dumper 1 is provided with a drive for the rear pairs of wheels 5, 6, and the torque provided by the prime mover is then transferred via a cardan shaft 26, 27 where the cardan shaft portion 27, located inside the extension device 10, is an extension member. Said cardan shaft portion 27 is preferably rotatably supported, for example by a ball bearing assembly 28, inside the guide pin 21.

According to a preferred embodiment of the extension device 10, a brake caliper 31 is fixedly connected to the framework of the extension device 10. Said brake caliper 31 is co-operating with a brake disc 32 arranged on the cardan shaft portion 27. When the brake caliper 31 is activated, in the known manner, the rear wheels 6, 7 are braked.

The term dumper, as used in the description and in the claims, shall mean any type of commercial automotive vehicle equipped with a forward vehicle section, supporting the prime mover, and a load- or equipment-carrying rear vehicle section, said vehicle sections being interconnected by means of a pivot joint allowing the vehicle sections to pivot, in relation to each other, about a longitudinal axis of the vehicle.

The invention will not be limited to what has been stated above, but may be varied within the scope of the appended claims. For example, the guide pin 21 could be excluded and replaced by any other type of fixation, such as a bolted or welded connection. Further, said first and second articulation members do not have to be formed like a pivot pin and a pivot sleeve, respectively, but could be formed like a turntable comprising a vertical ball bearing assembly, the rotational axis of which would be parallel with the longitudinal axis of the vehicle, one bearing race of the assembly being affixed to the forward vehicle section and the other bearing race being affixed to the rear vehicle section. In the above embodiment example, relative rotation is taking place between the vehicle sections at the connection between the forward vehicle section and the extension device, but it should be evident to the person skilled in the art that the rotation could just as well take place between the rear vehicle section and the extension device, or even at both of the above-mentioned locations. Furthermore it is advantageous to provide the extension device with a built-on accessory in the form of for example a crane.

The invention claimed is:

1. An extension device configured to form an elongated, articulated, horizontally rotatable interconnection between a forward, prime mover section of a wheeled vehicle and a rear, load-carrying section of the wheeled vehicle, said device facilitating extension of the length of the vehicle and comprising:

an elongated rigid frame having a horizontal longitudinal axis about which said forward and rear vehicle sections can rotate relative to each other and extending between a front end connector that matingly engages with the forward, prime mover wheeled vehicle section and a back end connector that matingly engages with the rear, load-carrying wheeled vehicle section, the elongated rigid frame holding the front and back end connectors in fixed, spaced relationship relative to each other;

wherein at least one of said connectors is a pivot connector that enables a rotatable connection about said horizontal longitudinal axis, the extension device being configured to and having sufficient strength to maintain the forward and the rear vehicle sections in longitudinally spaced apart relationship relative to each other, thus extending the length of the vehicle as compared to a non-extended configuration, while permitting the forward and the rear vehicle sections to pivot relative to each other about the horizontal longitudinal axis when the extension device is installed therebetween.

2. The device as recited in claim 1, wherein at least one of said front end and said back end connectors is a sleeve configured to receive an insert member of a respectively connected one of the forward, prime mover wheeled vehicle section and the rear, load-carrying wheeled vehicle section.

3. The device as recited in claim 2, wherein said sleeve is cylindrically shaped.

4. The device as recited in claim 3, wherein said pivot connector comprises said cylindrically shaped sleeve.

5. The device as recited in claim 3, further comprising a fixed connector comprised by said cylindrically shaped sleeve.

6. The device as recited in claim 5, wherein said fixed connector further comprises a fastener radially offset from said cylindrically shaped sleeve, said fastener being configured for fixed interconnection with one of the forward, prime mover wheeled vehicle section and the rear, load-carrying wheeled vehicle section.

7. The device as recited in claim 1, wherein said elongated rigid frame further comprises at least one stiffening girder arranged parallel to the horizontal longitudinal axis of the frame.

8. The device as recited in claim 7, wherein said at least one stiffening girder comprises a pair of stiffening girders, each arranged parallel to the horizontal longitudinal axis of the frame.

9. The device as recited in claim 1, wherein said elongated rigid frame further comprises a cardan shaft passageway therethrough which is arranged parallel to the horizontal longitudinal axis of the frame.

10. The device as recited in claim 9, wherein said cardan shaft passageway further comprises a brake arrangement comprising one of a brake disk and a caliper assembly for braking an installed cardan shaft.

11. The device as recited in claim 1, wherein said elongated rigid frame further comprises a plurality of rigid side walls forming a surrounding housing having an access aperture therethrough.

12. An articulated, wheeled vehicle that has been extended from a non-extended configuration to an extended configuration, the articulated wheeled vehicle comprising:
a forward, prime mover section articulatedly interconnected with a rear, load-carrying section in longitudinally spaced apart relationship to each other; and
an extension device installed between the forward and the rear vehicle sections so as to form an elongated, articulated, horizontally rotatable interconnection between said forward and rear vehicle sections;
said extension device comprising an elongated rigid frame having a horizontal longitudinal axis about which said forward and rear vehicle sections can rotate relative to each other and extending between a front end connector matingly engaged with the forward vehicle section and a back end connector matingly engaged with the rear vehicle section, the elongated rigid frame holding the front and back end connectors in fixed, spaced relationship relative to each other;
wherein at least one of said connectors is a pivot connector establishing a rotatable connection about said horizontal longitudinal axis of said frame, the extension device being configured to and having sufficient strength to maintain the vehicle in said extended configuration, with the forward and the rear vehicle sections in longitudinally spaced apart relationship relative to each other, while permitting the forward and the rear vehicle sections to pivot relative to each other about the horizontal longitudinal axis.

13. The articulated vehicle as recited in claim 12, wherein at least one of said front end and said back end connectors is a sleeve insertibly receiving an insert member of a respectively connected one of the forward, prime mover wheeled vehicle section and the rear, load-carrying wheeled vehicle section.

14. The articulated vehicle as recited in claim 13, wherein said sleeve is cylindrically shaped.

15. The articulated vehicle as recited in claim 14, wherein said pivot connector comprises said cylindrically shaped sleeve.

16. The articulated vehicle as recited in claim 14, further comprising a fixed connector comprised by said cylindrically shaped sleeve.

17. The articulated vehicle as recited in claim 16, wherein said fixed connector further comprises a fastener radially offset from said cylindrically shaped sleeve, said fastener being fixedly interconnected with one of the forward, prime mover wheeled vehicle section and the rear, load-carrying wheeled vehicle section.

18. The articulated vehicle as recited in claim 12, wherein said elongated rigid frame further comprises at least one stiffening girder arranged parallel to the horizontal longitudinal axis of the frame.

19. The articulated vehicle as recited in claim 18, wherein said at least one stiffening girder comprises a pair of stiffening girders, each arranged parallel to the horizontal longitudinal axis of the frame.

20. The articulated vehicle as recited in claim 12, wherein said elongated rigid frame further comprises a cardan shaft passageway therethrough which is arranged parallel to the horizontal longitudinal axis of the frame.

21. The articulated vehicle as recited in claim 20, wherein said cardan shaft passageway further comprises a brake arrangement comprising one of a brake disk and a caliper assembly for braking an installed cardan shaft.

22. The articulated vehicle as recited in claim 12, wherein said elongated rigid frame further comprises a plurality of rigid side walls forming a surrounding housing having an access aperture therethrough.

23. An articulated, wheeled dumper that has been extended from a non-extended configuration to an extended configuration, the articulated dumper comprising:
a forward, prime mover vehicle section articulatedly interconnected with a rear, wheeled dumper section in longitudinally spaced apart relationship to each other; and
an extension device installed between the forward and the rear sections so as to form an elongated, articulated, horizontally rotatable interconnection between said forward and rear sections;
said extension device comprising an elongated rigid frame having a horizontal longitudinal axis about which said forward and rear sections can rotate relative to each other and extending between a front end connector matingly engaged with the forward section and a back end connector matingly engaged with the rear section, the elongated rigid frame holding the front and back end connectors in fixed, spaced relationship relative to each other;
wherein at least one of said connectors is a pivot connector establishing a rotatable connection about said horizontal longitudinal axis of said frame, the extension device being configured to and having sufficient strength to maintain the dumper in said extended configuration, with the forward and the rear sections in longitudinally spaced apart relationship relative to each other, while permitting the forward and the rear sections to pivot relative to each other about the horizontal longitudinal axis of said frame.

24. The articulated vehicle as recited in claim 23, wherein at least one of said front end and said back end connectors is a sleeve insertibly receiving an insert member of a respectively connected one of the forward, prime mover wheeled vehicle section and the rear, wheeled, dumper section.

\* \* \* \* \*